Nov. 22, 1955     F. H. ROWE     2,724,454

SOUND DEADENER FOR VIBRATORY BODIES

Filed June 17, 1952

WITNESSES:

INVENTOR
FLOYD H. ROWE

ATTORNEY

United States Patent Office 2,724,454
Patented Nov. 22, 1955

2,724,454

SOUND DEADENER FOR VIBRATORY BODIES

Floyd H. Rowe, Wilbraham, Mass., assignor to Westinghouse Electric Corporation, East Pittsburgh, Pa., a corporation of Pennsylvania Application June 17, 1952, Serial No. 293,922

5 Claims. (Cl. 181—33)

This invention relates to the suppression of sound and more particularly to the reduction of noise emanating from the machinery compartment of a domestic refrigerator.

Sound, or noise, as unharmonious sound is called, becomes evident to the senses when a vibrating structure causes waves of compression and rarefaction to propagate through the air. Such a structure is generally driven by an oscillating force such as might be produced by an unbalanced electric motor or rotating equipment associated with the motor. In a mechanical refrigerator the offending structure is quite often the casing enclosing a hermetic motor-compressor unit, or cabinet panels in the vicinity of this unit. High noise levels are generally encountered around such structure when the vibrating frequency of the machinery becomes resonant with the natural frequency of the structure.

It has long been recognized that the noise level can be reduced by damping, i. e., reducing, the amplitude of resonant vibration. One method of accomplishing this damping is disclosed in Patent No. 2,285,924, issued June 9, 1942 to G. A. Halfvarson and assigned to the assignee of the present invention.

The sound deadening material disclosed in the above-mentioned patent comprises a sheet of metal divided into panels by a number of slits. Because the damping effect attained by this material depends upon the degree of interference and friction at the slits, the manufacturing tolerances are small and frequent replacement of dies is necessary. This of course increases the cost of the finished product.

The present invention is concerned with damping means of the type generally disclosed in the Halfvarson patent referred to above and constitutes an improvement thereover.

It is an object of this invention to provide improved means for reducing the amplitude of vibration of a structure.

A more specific object of the invention is to reduce the noise emanating from a hermetically sealed motor compressor unit for mechanical refrigerators.

These and other objects are effected by my invention as will be apparent from the following description taken in connection with the accompanying drawings, forming a part of this application, in which.

Figure 1:
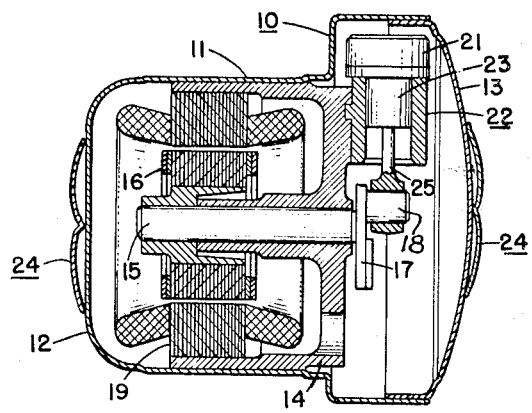
Fig. 1 is a sectional view of an enclosed motor compressor unit equipped with the vibration damping means of this invention.

Referring to the drawing wherein I have shown my invention as adapted to the motor compressor unit of a domestic refrigerator, the numeral 10 designates generally the casing structure for such unit. The casing structure 10 comprises a cup shape body portion 11 having a generally flat end wall 12 and a dish shaped end wall 13. Pressed within the casing body portion 11 is a motor frame 14 having journaled therein an overhanging shaft 15 which in turn carries a rotor 16 on one of its overhanging ends and a crank member 17 having a crank pin 18 on the other of its overhanging ends. The frame 14 also supports a stator 19 of the compressor motor. A cylinder 21 of a reciprocating compressor pump 22 is secured to a portion of the motor frame 14 and cooperates with a piston 23 actuated by rod 25 connecting the crank pin 18.

The motor compressor unit vibrates during operation due, in part, to the inertia forces associated with unbalanced parts rotating at a speed of approximately 1750 R. P. M. and, in part, to motor output torque vibrations occurring at a frequency of 120 cycles per second in the case of a single-phase 60 cycle alternating current motor. The vibration of the motor compressor unit is transferred to the compressor casing structure 10 which in turn is set in vibration and tends to send out sound waves within the audible frequency range. The casing end walls 12 and 13 have natural frequencies of vibration, which when resonant with the vibrations of the motor compressor, are increased in amplitude to the extent of producing a high noise level. From the standpoint of the production of noise, the end panels, such as 12 and 13 of the motor compressor unit illustrated, are likely to be the most offending portions of the machine or structure. It is therefore desirable to provide some means for damping and reducing the amplitude of vibration of the end walls 12 and 13 in order to effect a reduction in the sound or noise emanating from the machine.

Figure 2:
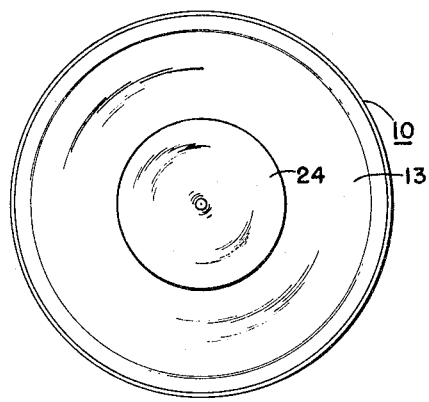
Fig. 2 is an end view of the motor compressor unit shown in Fig. 1.
Figure 3:
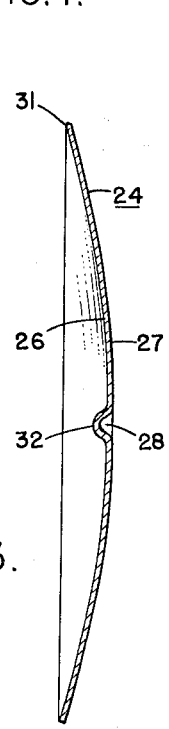
Fig. 3 is a sectional view of the vibration damping member employed in this invention.
Figure 4:
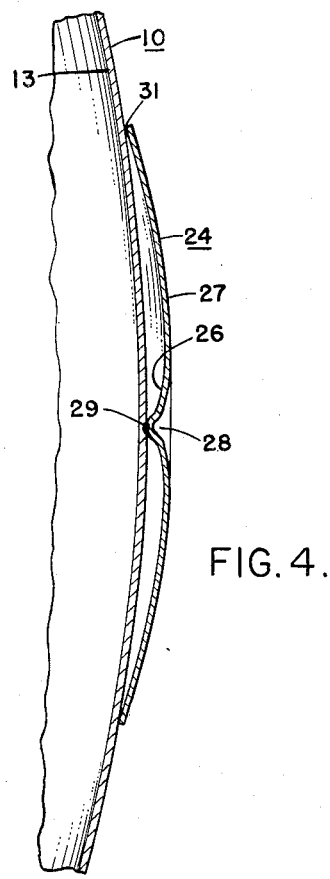
Fig. 4 is an enlarged sectional view of a portion of the motor-compressor casing shown in Fig. 1 with the vibration damping member attached.

The present invention is concerned with apparatus for producing the damping action and as shown in Figs. 1 and 2 comprises a damping member 24 secured to each of the casing end walls 12 and 13. Referring to Fig. 3, the damping member 24 comprises a dished disc of resilient sheet metal having a concave surface 26 and a convex surface 27. The damping member 24 is secured to the casing end wall 12 or 13 by welding a central portion 28 of the member to the casing end wall as indicated at 29. The member 24 is formed with the concave surface 26 having a radius slightly less than the radius of the surface of the structure to which the member is to be attached. It will thus be seen that when the central portion 28 of the member 24 is welded in place, the peripheral edge 31 of the member will be forced into tight frictional engagement with the surface of the structure.

The damping member 24 may if desired be provided with a small projection 32 at its center to facilitate the location of the central portion 28 of the member during the operation of attaching the member to the structure to be damped.

While the damping action of member 24 is not fully understood, it is known that a sheet metal structure, when vibrating, does not move as a unitary rigid mass but rather, various portions of the structure undergo deflections relative to one another. It is believed that the damping member vibrates or oscillates in phase with that portion of the structure to which it is attached and, consequently, the oscillation of the edge of the damping member is not in phase with oscillation of that portion of the structure in engagement with the edge. The resulting interference and rubbing friction between the edge of the damping member and the structure is believed to reduce the amplitude of vibration of the structure.

While the damping members illustrated in the drawing all have a concave-convex configuration, it is to be understood that the actual shape of the member may vary depending upon the configuration of the surface to which it is applied. It is necessary only that the surface of the damping member adjacent the dampened structure be concave with reference to the surface of the structure. For example, it might be desirable for one reason or another to apply the damping member 24 to the interior surface of the casing wall 13. Since this surface of the casing of the end wall 13 is of itself concave, the damping member 24 might take the form of a flat disc secured at its central portion to the end wall 13. In other words, the configuration of the damping member should be such with respect to the surface to which it is attached that the peripheral edge of the member will be forced into tight frictional engagement with the structure when the center of the member is secured to the structure.

While I have shown and described a damping member having its central portion 28 welded to the damping structure, it will be obvious that other methods of attachment such as riveting or bolting may be utilized in practicing the invention.

It will further be apparent that the damping member herein disclosed may be attached to other sound emanating structures, such as panels or structural sheets of metal positioned adjacent the vibrating machine for reducing the sound generating capacity of the structures. Furthermore, the damping member need not necessarily be made circular in shape but may have an irregular shape to meet the requirements of various applications; the only requirement being that portions of the peripheral edge of the member engage the surface of the structure when a central portion of the member is secured to the structure.

While I have shown my invention in but one form, it will be obvious to those skilled in the art that it is not so limited, but is susceptible of various changes and modifications without departing from the spirit thereof.

What I claim is:

1. The combination with a structure the amplitude of vibration of which is to be reduced, of a metallic sheet member formed to a concave configuration and means for securing a central portion of said sheet member to said structure, the concave side of said sheet member facing said structure whereby the peripheral edge of said sheet member is forced against said structure by said securing means, said sheet member having a surface area between said central secured portion and said peripheral edge which is spaced from said structure.

2. The combination with a casing side wall, of means for reducing the amplitude of vibration of said side wall, said means comprising a metallic disc and means for securing a central portion of said disc in contact with said side wall, said disc being provided with a surface configuration which is generally concave with reference to the surface of said casing side wall whereby the periphery of said disc is forced against said casing side wall by said securing means and a space is provided between the disc and the side wall.

3. The combination with a vibratory structure, of a metal plate for reducing the amplitude of vibration of the structure, and securing means for rigidly attaching a central portion of said plate to said structure, said plate when attached having its peripheral edge portion forced by the securing means into tight frictional engagement with said structure and providing with the structure a space between the central portion and the peripheral edge of the plate.

4. The combination with a vibratory structure, of a resilient sheet metal plate for reducing the amplitude of vibration of the structure, said plate having a central portion and an engaging portion surrounding the central portion and adjacent the peripheral edge of the plate, and means for securing the central portion to the structure, said means forcing the engaging portion of the plate into tight frictional engagement with the surface of the vibratory structure.

5. The combination set forth in claim 4, wherein opposing surfaces of said plate and said vibratory structure, between said central and engaging portions, are spaced from each other.

References Cited in the file of this patent
UNITED STATES PATENTS

| | | |
|---|---|---|
| 1,318,574 | Mazer | Oct. 14, 1919 |
| 1,584,109 | Ludlow | May 11, 1926 |
| 2,151,084 | Deremer | Mar. 21, 1939 |
| 2,285,924 | Halfvarson | June 9, 1942 |
| 2,541,159 | Geiger | Feb. 13, 1951 |
| 2,545,961 | Levy | Mar. 20, 1951 |
| 2,610,695 | Grue | Sept. 16, 1952 |